US009940701B2

United States Patent
Bronstein et al.

(10) Patent No.: US 9,940,701 B2
(45) Date of Patent: Apr. 10, 2018

(54) DEVICE AND METHOD FOR DEPTH IMAGE DEQUANTIZATION

(71) Applicant: INTEL CORPORATION, Santa Clara, CA (US)

(72) Inventors: Michael Bronstein, Lugano (CH); Zachi Karni, Givat Ela (IL); Alex Bronstein, Haifa (IL); Ron Kimmel, Haifa (IL); Erez Sperling, D.N. Menashe (IL); Aviad Zabatani, Even Yehuda (IL); Vitaly Surazhsky, Yokneam Illit (IL)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 14/865,201

(22) Filed: Sep. 25, 2015

(65) Prior Publication Data
US 2017/0091917 A1    Mar. 30, 2017

(51) Int. Cl.
| | | |
|---|---|---|
| G06T 5/00 | (2006.01) | |
| G06K 9/00 | (2006.01) | |
| G06T 5/20 | (2006.01) | |
| G06T 7/00 | (2017.01) | |
| H04N 13/02 | (2006.01) | |
| G06K 9/40 | (2006.01) | |

(52) U.S. Cl.
CPC .............. G06T 5/20 (2013.01); G06K 9/40 (2013.01); G06T 7/0051 (2013.01); H04N 13/0203 (2013.01)

(58) Field of Classification Search
CPC ........................................................ G06K 9/40
See application file for complete search history.

(56) References Cited

U.S. PATENT DOCUMENTS

| | | | | |
|---|---|---|---|---|
| 8,189,944 | B1 * | 5/2012 | Lim ..................... | G06K 9/40 382/260 |
| 8,619,082 | B1 * | 12/2013 | Ciurea ................. | G06T 7/593 345/427 |
| 8,744,167 | B2 * | 6/2014 | Kang ................... | G06T 5/002 348/42 |
| 2009/0136112 | A1 * | 5/2009 | Bismuth ............... | G06T 5/002 382/132 |
| 2010/0183240 | A1 * | 7/2010 | Hiraga ................. | G06T 7/13 382/264 |

(Continued)

*Primary Examiner* — Utpal Shah
(74) *Attorney, Agent, or Firm* — Alpine Technology Law Group LLC

(57) ABSTRACT

A mechanism is described for facilitating depth image dequantization at computing devices according to one embodiment. A method of embodiments, as described herein, includes detecting a digital image of an object, the digital image including pixels having associated pixel values contaminated by noise, and side information pertaining to confidence of a value acquired in each pixel. The method may further include measuring characteristics of noise in each pixel of the digital image, and a plurality of weights relating to one or more of the pixel values, the side information, and the noise characteristics. The method may further include computing a smart filter based on a combination of the plurality of weights, applying the smart filter to filter the digital image by reducing the noise in the digital image, and outputting the filtered digital image.

21 Claims, 12 Drawing Sheets

(56) References Cited

U.S. PATENT DOCUMENTS

2014/0050417 A1* 2/2014 Jiang ................. G06K 9/40
  382/261
2014/0079336 A1* 3/2014 Venkataraman ........ G06T 5/005
  382/275
2017/0094243 A1* 3/2017 Venkataraman ... H04N 13/0007

* cited by examiner

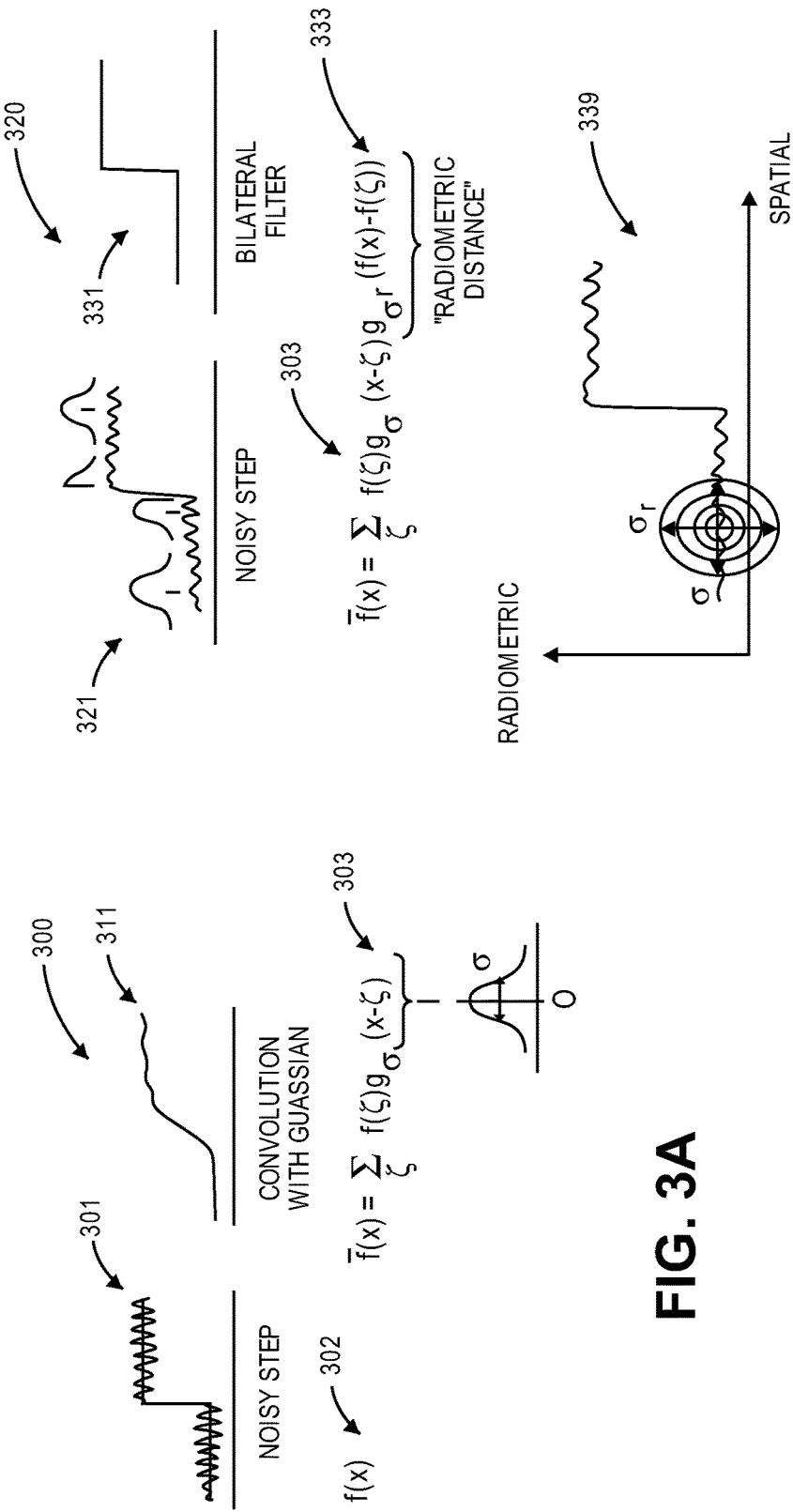

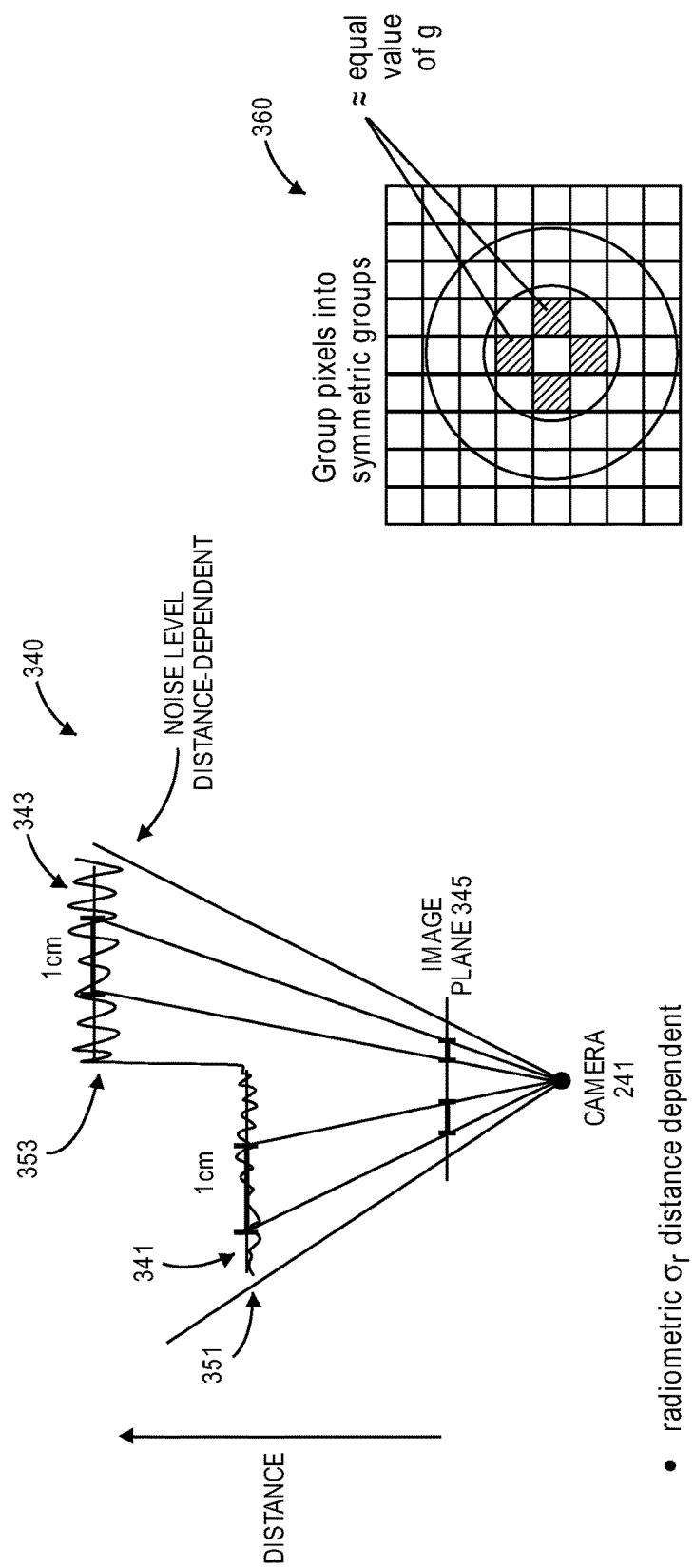

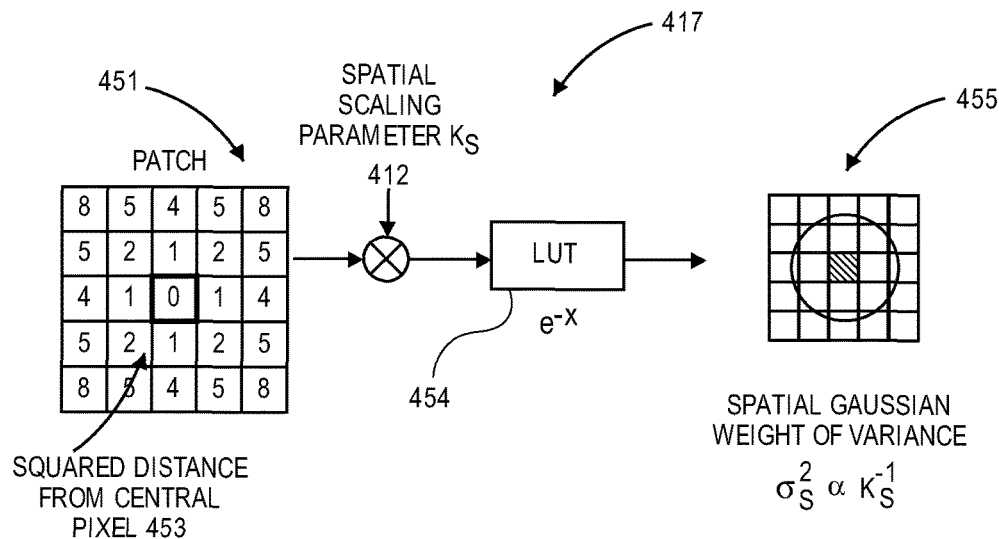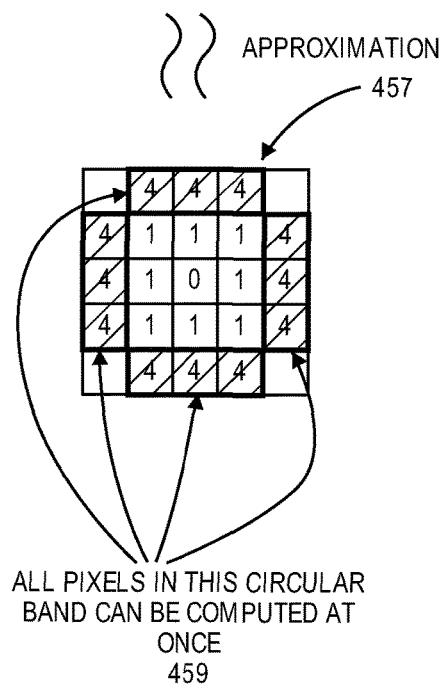
FIG. 4D

DEVICE AND METHOD FOR DEPTH IMAGE DEQUANTIZATION

FIELD

Embodiments described herein generally relate to computers. More particularly, embodiments relate to facilitating depth image dequantization at computing devices.

BACKGROUND

It is well known that acquisition techniques used for the creation of digital images introduce noise and artifacts resulting from imperfection of the imaging process. It is therefore common to use noise-reducing filters. In the domain of three-dimensional (3D) image acquisition, the image formation process typically involves triangulation techniques resulting in particular quantization noise that are not handled well by standard image filters and require the design of a special filter that accounts for the particular structure of such noise.

BRIEF DESCRIPTION OF THE DRAWINGS

Embodiments are illustrated by way of example, and not by way of limitation, in the figures of the accompanying drawings in which like reference numerals refer to similar elements.

FIG. 3A illustrates a standard linear filter.

FIG. 3B illustrates a nonlinear bilateral filter.

FIG. 3C illustrates a distance-noise level dependence according to one embodiment.

FIG. 3D illustrates a pixel window according to one embodiment.

FIG. 4D illustrates computation of a spatial weight as described with reference to FIG. 4A according to one embodiment.

DETAILED DESCRIPTION

Figure 1:
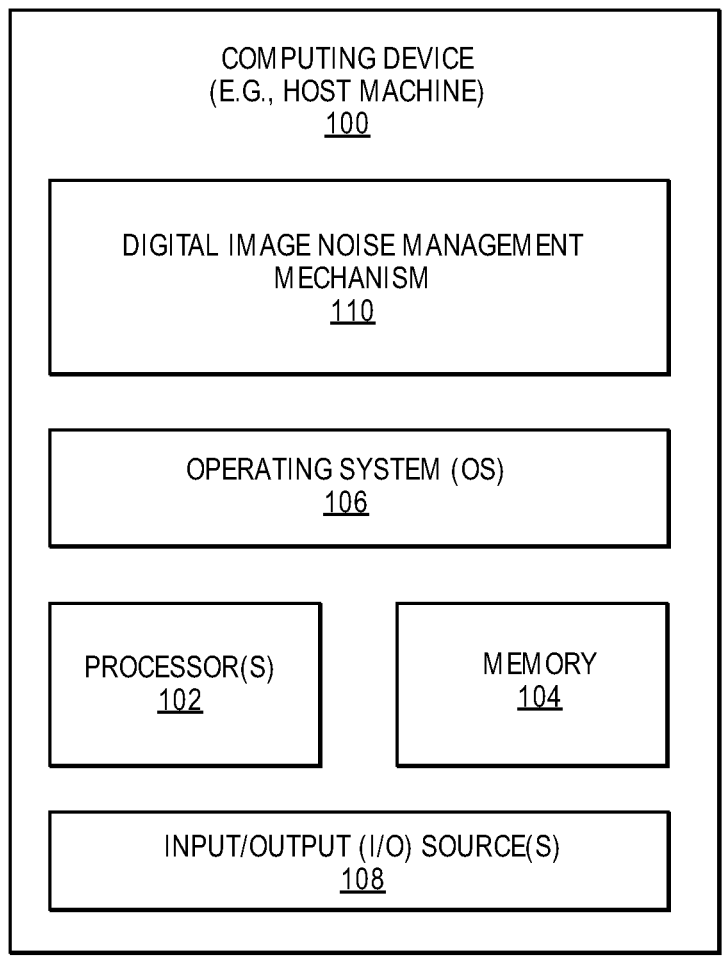
FIG. 1 illustrates a computing device employing a digital image noise management mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel adaptive, non-linear, edge-preserving filter (also referenced as "non-linear filter", "de-quantization filter", "noise filter", "dequantizer", "noise management filter", "multi-weight filter", or simply "smart filter") that is suitable for removal of quantization noise in depth images typical of triangulation-based 3D acquisition system. At each pixel, the filter estimates the noise characteristics and (as inferred from the depth values) and depth estimation confidence (as inferred from side information provided by a reconstruction pipeline) and adapts the filter parameters accordingly. This novel smart filter provides for better noise smoothing compared to conventional standard filters, allowing the use of a single filter/set of parameters for all depths as opposed to configuring standard filters for specific depth ranges.

It is contemplated that "noise", throughout the document, interchangeably refers to "image noise" which is regarded as an undesirable by-product of image capture that is known for adding information or data that may be regarded as bogus, unauthenticated, illegitimate, unwanted, spurious, irrelevant, superfluous, and/or the like. The noise may be a form of electronic noise along with being a random variation of brightness or color information in digital images, where the noise may originate from any number and type of sources, such as film grain, etc., or be generated or caused by one or more input/out components of computing devices, such as one or more of digital depth-sensing cameras, sensors, detectors, scanners, etc. For example, noise refers to image noise that includes one or more of quantization noise, Gaussian noise, salt-and-pepper noise, short noise, anisotropic noise, and film grain.

In particular, one type of noise typical for triangulation-based systems appears in the form of saw-tooth artifacts, where the amplitude of the saw-tooth depends on the distance from the camera.

In one embodiment, image receiving or capturing, depth measuring, etc., may be performed by one or more components of image capturing/depth sensing systems, such as depth sensors, depth-sensing cameras (e.g., Intel® RealSense™, etc.), ranging cameras, time-of-flight (ToF) cameras, etc.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to digital images, depth sensing, creating and executing filters, tracking, progressing, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 2:
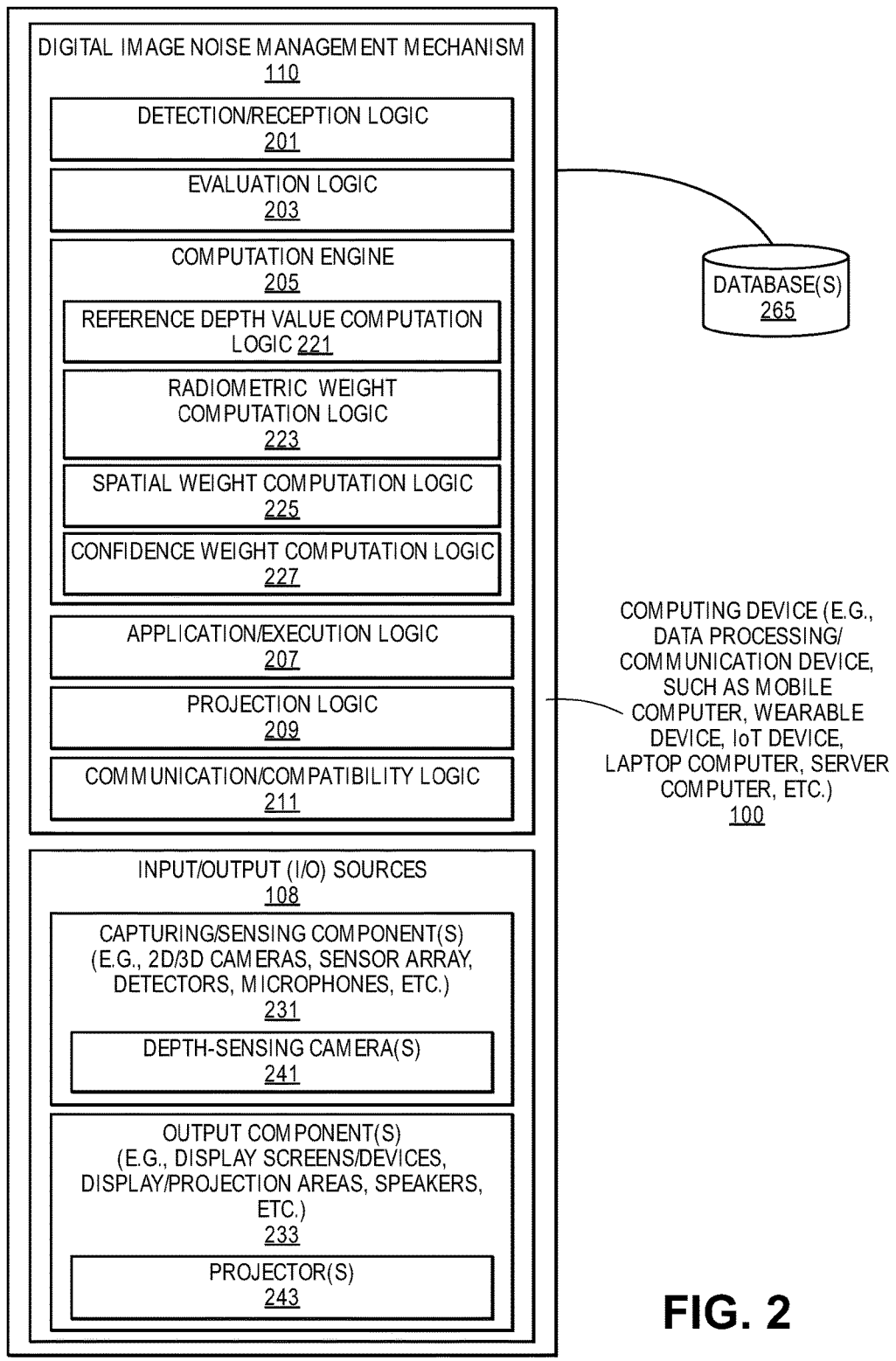
FIG. 2 illustrates a digital image noise management mechanism according to one embodiment.

FIG. 1 illustrates a computing device 100 employing a digital image noise management mechanism 110 according to one embodiment. Computing device 100 servers a host machine for hosting digital image noise management mechanism ("noise management mechanism") 110 that may include any number and type of components, as illustrated in FIG. 2, to facilitate intelligent and dynamic reduction in unwanted noise (e.g., undesirable information, etc.) in digital images that are captured or received using one or more of depth sensors, depth-sensing cameras (e.g., Intel® RealSense™, etc.), ranging cameras, time-of-flight (ToF) cameras, etc., to enhance user experience by offering clearer images, as will be further described throughout this document.

Computing device 100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, smart windshields, smart windows, head-mounted displays (HMDs) (e.g., optical head-mounted display (e.g., wearable glasses, head-mounted binoculars, gaming displays, military headwear, etc.), and other wearable devices (e.g., smartwatches, bracelets, smartcards, jewelry, clothing items, etc.), etc.

It is contemplated and to be noted that embodiments are not limited to computing device 100 and that embodiments may be applied to and used with any form or type glass that is used for viewing purposes, such as smart windshields, smart windows (e.g., smart window by Samsung®, etc.), and/or the like. Similarly, it is contemplated and to be noted that embodiments are not limited to any particular type of computing device and that embodiments may be applied and used with any number and type of computing devices; however, throughout this document, the focus of the discussion may remain on wearable devices, such as wearable glasses, etc., which are used as examples for brevity, clarity, and ease of understanding.

In some embodiments, computing device 100 may include a large(r) computing system (e.g., server computer, desktop computer, laptop computer, etc.), such that a flexible display screen may be part of this large(r) computing system where the flexible display screen may be a part or an extension screen of a main display screen, where the main screen itself may be flexible or static.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as one or more touchable and/or non-touchable flexible display screen(s) (e.g., foldable screens, roll-able screens, bendable screens, curve-able screens, etc.), touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

FIG. 2 illustrates a digital image noise management mechanism 110 according to one embodiment. In one embodiment, noise management mechanism 110 may include any number and type of components, such as (without limitation): detection/reception logic 201; evaluation logic 203; computation engine 205 including reference depth value computation logic ("reference logic") 221, radiometric weight computation logic ("radiometric logic") 223, spatial weight computation logic ("spatial logic") 225, confidence weight computation logic ("confidence logic") 227; application/execution logic 207; projection logic 209; and communication/compatibility logic 211. Computing device 100 is further shown as hosting input/output source(s) 108 having capturing/sensing components 231 including depth camera(s) 241, sensors, detectors, microphones, etc., and output sources 233 including one or more projector(s) 243, display devices, speakers, etc.

In one embodiment, noise reduction mechanism 110 may be hosted by computing device 100, such as a communication/data processing device including a mobile computer (e.g., smartphone, tablet computer, etc.), a wearable computers (e.g., wearable glasses, smart bracelets, smartcards, smart watches, HMDs, etc.), an Internet of Things (IoT) devices, and/or the like. In another embodiment, computing device 100 may be a larger communication machine, such as a server computer, a desktop computer, a laptop computer, etc. In one embodiment, computing device 100 may be in communication with one or more other computing devices (also referred to as "personal devices"), such as mobile computers, wearable devices, etc., over communication medium, such as one or more networks (e.g., cloud network, the Internet, proximity network, such as Bluetooth, etc.).

For example and in one embodiment, computing device 100 may serve as a server computer hosting noise reduction mechanism 110 in its entirety while communicating one or more services offered by noise reduction mechanism 110 with one or more other devices, such as client/personal devices, over communication medium, such as a cloud network. In another embodiment, computing device 100 itself may be another personal device having noise reduction mechanism 110, either partially or entirely, as part or in support of a software application, such as software application (also referred to as "application" or "client-based application") including a noise reduction (NR) application or a non-NR application or any other type of software application, such as a web browser, which may be downloadable or accessible over one more networks.

I/O source(s) 108 include capturing/sensing component(s) 231 and output component(s) 233 which, as will be further described below, may also include any number and type of components, sensor arrays, detectors, displays, etc. For example, capturing/sensing components 231 may include (without limitation) depth-sensing camera(s) (e.g., Intel® RealSense™ camera, etc.), two-dimensional (2D) cameras, three-dimensional (3D) cameras, sensor arrays (such as context/context-aware sensors and environmental sensors, such as camera sensors, ambient light sensors, Red Green Blue (RGB) sensors, movement sensors, etc.), image sources, audio/video/signal detectors, microphones, eye/gaze-tracking systems, head-tracking systems, etc.), etc., while, output components 233 may include (without limitation) projector(s) 243, display/projection areas, audio/video/signal sources, display planes, display panels, display screens/devices, projectors, display/projection areas, speakers, etc.

Computing device 100 may be further in communication with one or more repositories or data sources or databases, such as database(s) 265, to obtain, communicate, store, and maintain any amount and type of data (e.g., convoluation data, deconvolution data, transition stripes data, shaping data, pre-shaping data, captured digital images, projection data, recommendations, predictions, data tables, data maps, media, metadata, templates, real-time data, historical contents, user and/or device identification tags and other information, resources, policies, criteria, rules, regulations, upgrades, etc.).

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

In one embodiment, a projector, such as projector 243 (e.g., intelligent vision camera (IVCAM) projector), projects patterns of binary code (e.g., vertical stripes) that are reflected from an object and captured by a camera, such as camera 241. Similarly, projector 243 may also be responsible for projected any image noise that is not eliminated or reduced from its corresponding digital image. For example, when using camera 241 (e.g., Intel® RealSense™ coded-light 3D camera), a scene may be illuminated by a sequence of binary code patterns (e.g., vertical stripes, such as black and white stripes) that are captured by camera 241, where each pixel as seen by camera 241 may have a code allowing to infer the depth of the scene by, for example, triangulation from the known relative positions of camera 241 and projector 243.

In some embodiments, there are several characteristics to this depth, as estimated by camera 241, which may be common in other structured/coded light systems. First, for example, the depth estimation accuracy may not be equal at each pixel, where depth at pixels falling on the boundaries of code pattern transition may be estimated with greater accuracy. Second, for example, the noise in the depth stemming from the quantization of the code may have the shape of a saw-tooth, where the width of the tooth may depend on the width of the thinnest code pattern, while the amplitude may depend on the distance from camera 241 (e.g., in a non-linear manner). Accordingly, in one embodiment, to remove this code quantization-related image noise, a filter may be applied to the depth image, where the filter satisfies preservation of depth edges, etc. However, conventional filters fail to account for specific noise patterns.

In one embodiment, a multi-weight smart filter is provided where the smart filter weights are composed of one or more weighting functions, such as (without limitations): 1) spatial weight with effective width adapted at each pixel based on the depth value; 2) radiometric weight with variance adapted at each pixel in accordance with noise level estimated from the depth value; and 3) confidence weight.

In one embodiment, a digital image of an object may be captured by camera 241, where the image may then be detected by or received at detection/reception logic 201. It is contemplated that this image may include a number and type of distortions, such as image noises representing information/data that may regarded as unwanted, unessential, unnecessary, etc. In one embodiment, these image noises may be detected by detection/reception logic 201. Upon detection of noise in the captured image by detection/reception logic 201, evaluation logic 203 may be triggered to evaluate the noise and any other relevant data to determine whether the noise needs to be smoothed out and what type of filter is to be selected to accomplish the task. For example, as illustrated with respect to FIGS. 3A-3B, a standard linear filter of FIG. 3A may be applied to smooth out the noise, but this filter is also known to smooth out the transitions ("edges") which makes the image blurry, losing the image's sharpness.

A remedy used in image filtering is a non-linear bilateral filter shown in FIG. 3B, which senses the presence of transitions and weights the filter accordingly (through "radiometric weight", where the term "radiometric" here is used generically, referring to the space of image values; in the case of the filter applied to a depth image, the term "radiometric" is synonymous with "depth") to prevent blurring across edge. Away from edges, the bilateral filter acts similarly to the standard linear filter. The "radiometric variance" ($y_r$, controls the level of discontinuity that would not be filtered; discontinuities below this level would be regarded as noise and filtered out.

FIG. 3C illustrates a simplified characteristic of noise typically produced by triangulation-based 3D imaging systems. This noise typically has saw-tooth like appearance. The amplitude of the noise increases with depth; the sawtooth spacing may decrease with depth. Furthermore, typically the confidence of depth estimation is higher at some pixels (typically lower or upper parts of the saw-tooth).

Applying a bilateral filter to remove such noise may be problematic as one would have to choose a representative "radiometric variance" parameter for the radiometric weight of the bilateral filter, which would fit for a small range of distances: at short distances, the filter would tend to over-smooth and at long-distances it will tend to under-smooth.

In one embodiment, as will be further described with reference to FIG. 4A, an adaptive non-linear smart filter is required to cope with noise in depth images similar to the described above. For example, evaluation logic 203 may evaluate the noise characteristics along with other relevant data, such as depth image, label, etc., to determine various weights (e.g., spatial weight, radiometric weight, confidence weight, etc.), which may then be used to obtain the desired non-linear smart filter. For example, the depth image or simply depth may be an input along with other information, such as label, obtained from a reconstruction pipeline, where label per pixel represents confidence.

Once the noise and other data, such as depth image, label, parameters, etc., have been evaluated by evaluation logic 203, any evaluation results are then forwarded on to computation engine 205 to perform the relevant weight computations. These evaluation results may include relevant information like noise strength (as inferred from the depth captured by depth-sensing camera 241), depth estimation confidence (as inferred from side information provided by a reconstruction pipeline), etc., to help compute different weights.

For example and in one embodiment, reference logic 221 computes reference depth value relating to the depth frame based on parameters, depth Z obtained through patch, etc. Similarly, in on embodiment, radiometric logic 223 may then compute the radiometric weight, which may be regarded as intensity Gaussian of varying variances, where a variance depends on the depth that is computed as the reference depth value by reference logic 221.

In one embodiment, spatial logic 225 determines spatial weight that is spatial Gaussian of varying variances, where a variance depends on the depth, which computed as the reference depth value by reference logic 221. Finally, in one embodiment, confidence weight is computed by confidence logic 227 based on provided pixel confidence labels. For example, the confidence weight may include a confidence level for each pixel, such as 1) normal confidence level ("normal level") for normal pixels, 2) high confidence level ("high level") for code transition pixels, where high level is more confident than normal level, 3) less confidence level ("less level") where binarizer has issues coding the pixel, and 4) other additional or alternative confidence levels may be used. In one example, higher weights may be given to pixels with higher level. In another example, the weights may be set such that high confidence pixels may be exclusively used.

In one embodiment, once different weights and measures are obtained using computation engine 205, application/execution logic 207 is triggered to execute the novel smart filter by applying it to the depth image in order to remove the code quantization-related noise from the image, while preserving the depth edges. Further, in one embodiment, the use of this quantization-related noise also allows for a set of parameters to be used with a single filter rather than having to configure a convention standard filter for a specific depth range.

In one embodiment, once the noise has been eliminated or at least significantly removed from the image, the resulting image may be verified and projected by projector 243 and as facilitated by projection logic 209. For example, during use, projector 243 may be configured by projection logic 209 to project the digital image without or smoothed out noise, leaving a sharper and uncorrupted image.

Communication/compatibility logic 211 may be used to facilitate dynamic communication and compatibility between computing device 100, database(s) 265, communication medium, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "image", "digital image", "depth-sensing camera", "capture", "receive", "project", "projector", "object", "noise", "image noise", "quantization noise", "de-quantization filter", "non-linear filter", "multi-weight filter", "noise filter", "noise management filter", "smart filter", "reference depth value", "depth weight", "spatial weight", "confidence weight", "noise reduction", "noise elimination", "noise management", "sharpness", "user", "user profile", "user preference", "user", "sender", "receiver", "personal device", "smart device", "mobile computer", "wearable device", etc., should not be read to limit embodiments to software or devices that carry that label in products or in literature external to this document.

The term "radiometric" refers to the values of the image on which the filter is applied, without limitation to a specific image formation process. In particular, the image contains depth information, where "radiometric" is synonymous with "depth".

It is contemplated that any number and type of components may be added to and/or removed from noise management mechanism 110 to facilitate various embodiments including adding, removing, and/or enhancing certain features. For brevity, clarity, and ease of understanding of noise management mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 3A illustrates a standard linear filter 300. As illustrated (for simplicity, showing one-dimensional signals), standard filter 300 represented by convolution with Gaussian function 303 is applied to noisy signal 301, represented by a step-like function, $f(x)$, 302, to produce the output signal 311 that has less noise but also the step is blurred.

Referring now to FIG. 3B, it illustrates a non-linear bilateral filter 320. As illustrated, bilateral filter 320 may be regarded as an extension of standard filter 300 of FIG. 3A in that bilateral filter 320 includes radiometric distance 333 in the equation in addition to Gaussian function 303 of standard filter 300. When applied on input signal 321, bilateral filter 320 produces output signal 331, where the level of noise is lower and the step is intact. FIG. 3B further provides graph 339 illustrating a relationship between radiometric values and spatial values.

FIG. 3C illustrates a distance-noise level dependence 340 according to one embodiment. In one embodiment, graph 340 shows the nature of noise in a coded light system, where two observations are illustrated, such as 1) the dependence of noise 341, 343 on the distance of or from camera 241 (e.g., the farther away the camera 241, the stronger the noise 341, 343), and 2) the size of pixel window 360, as shown in FIG. 3D, in a camera image that corresponds to a physical distance unit at various distances 351, 353 (e.g., the farther away the camera 241, the smaller the window 360).

As illustrated, in some embodiments, noise levels may be distance-dependent and thus rise with the increase in distance from camera 241 (e.g., depth-sensing camera) and image plane 245. For example, in one embodiment, at distance 1 351, noise level 341 over a span of 1 cm is shown, while at distance 2 353, noise level 343 over the same 1 cm span is shown as much higher then noise level 341 at distance 351. Further, in one embodiment, the larger the distance, the greater the radiometric values for them being distance-dependent, while spatial distance provides for a smaller window at a larger distance.

FIG. 3D illustrates a filter window structure 360, which may be used in some embodiments for a more efficient computation of the filter. In one embodiment, pixels with similar spatial weight (approximately equal values of the Gaussian function, g) are grouped in symmetric groups and an equal weigh value is assigned to all the pixels in the group. This may result in simplification of the arithmetic operations or simplification of the logic circuits required to carry out the filtering in some embodiments.

Figure 4A:
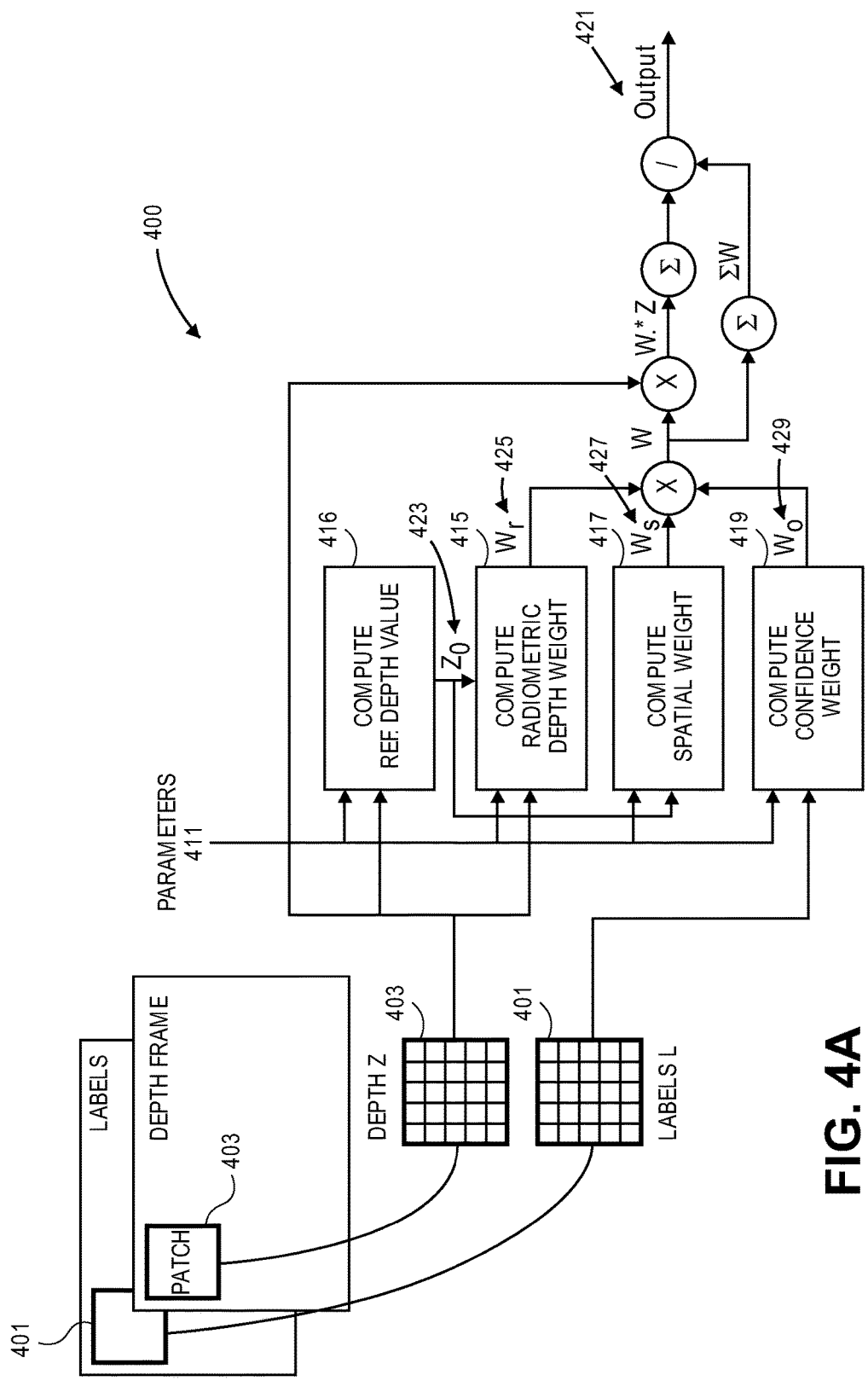
FIG. 4A illustrates a transaction sequence for generating a noise filter according to one embodiment.

FIG. 4A illustrates a transaction sequence 400 for generating a smart filter according to one embodiment. Transaction sequence 400 may be performed by processing logic that may comprise hardware (e.g., circuitry, dedicated logic, programmable logic, etc.), software (such as instructions run on a processing device), or a combination thereof, as facilitated by noise management mechanism 110 of FIGS. 1-2. The processes of transaction sequence 400 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

In one embodiment, as illustrated, an input is received into one or more components of a digital imaging system, such as depth-sensing camera 241 of FIG. 2, wherein the input includes a depth image, such as a depth frame having patch 403, along with some additional information, such as labels having a patch 401, labels per pixel represent confidence acquired from a reconstruction pipeline. Further, for example, the smart filter may operate on a patch of pixels, such as patch 403, that is extracted from digital image, outputting a filtered pixel values as a normalized weighted combination of patch values, such as depth Z 407, relating to patch 403. Further, in one embodiment, as desired or necessitated, any number and type of parameters 411 may also be considered, such as what level or type of noise may be acceptable, what may be considered a sufficient level of noise reduction, data relating to computing and/or imaging system limitations, such as a number and type of input/output sources 108 of FIG. 2, such as sensors, detectors, lenses, microphones, speakers, camera 241, projector 243, etc.

Figure 4B:
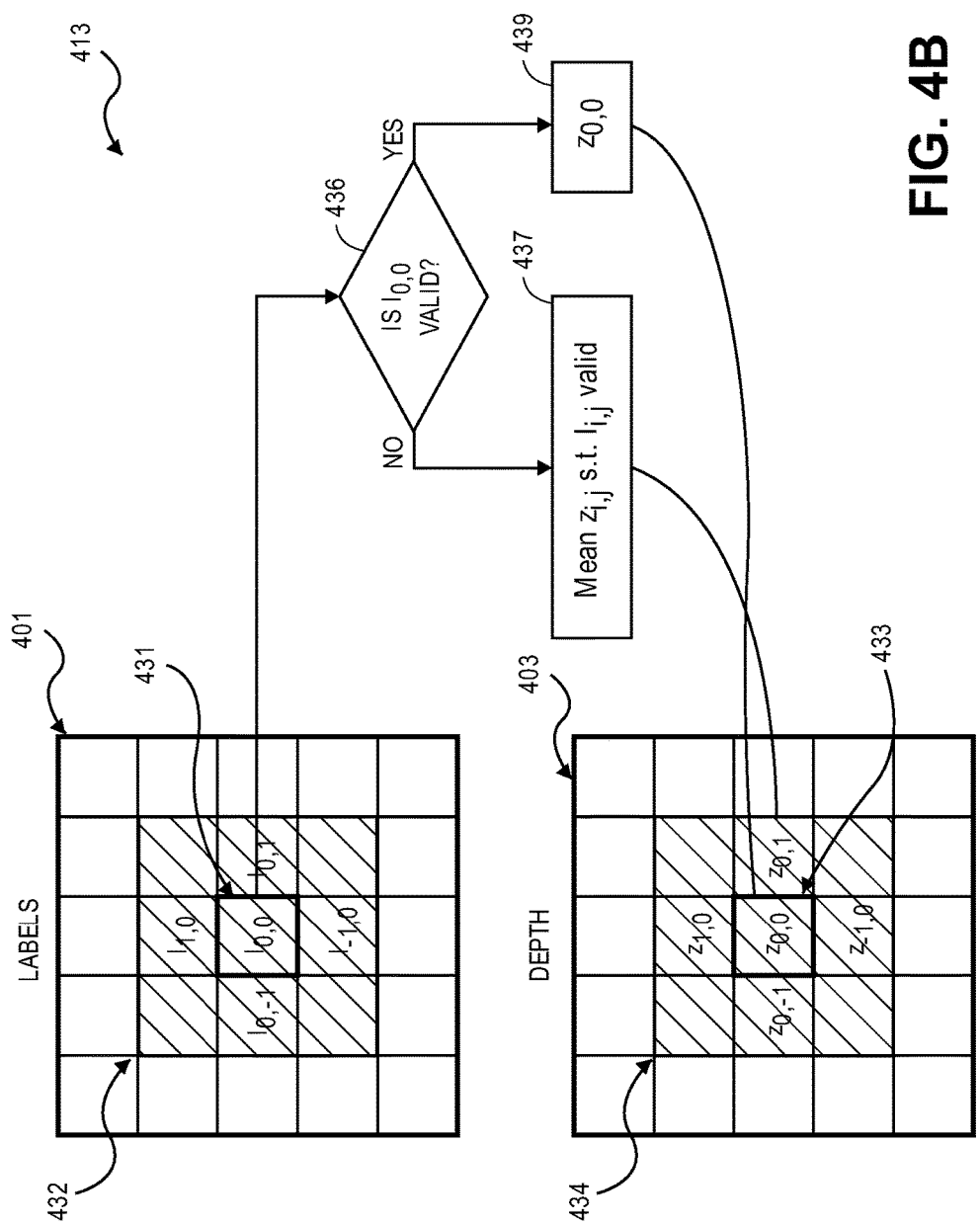
FIG. 4B illustrates computation of a reference depth value as described with reference to FIG. 4A according to one embodiment.
Figure 4C:
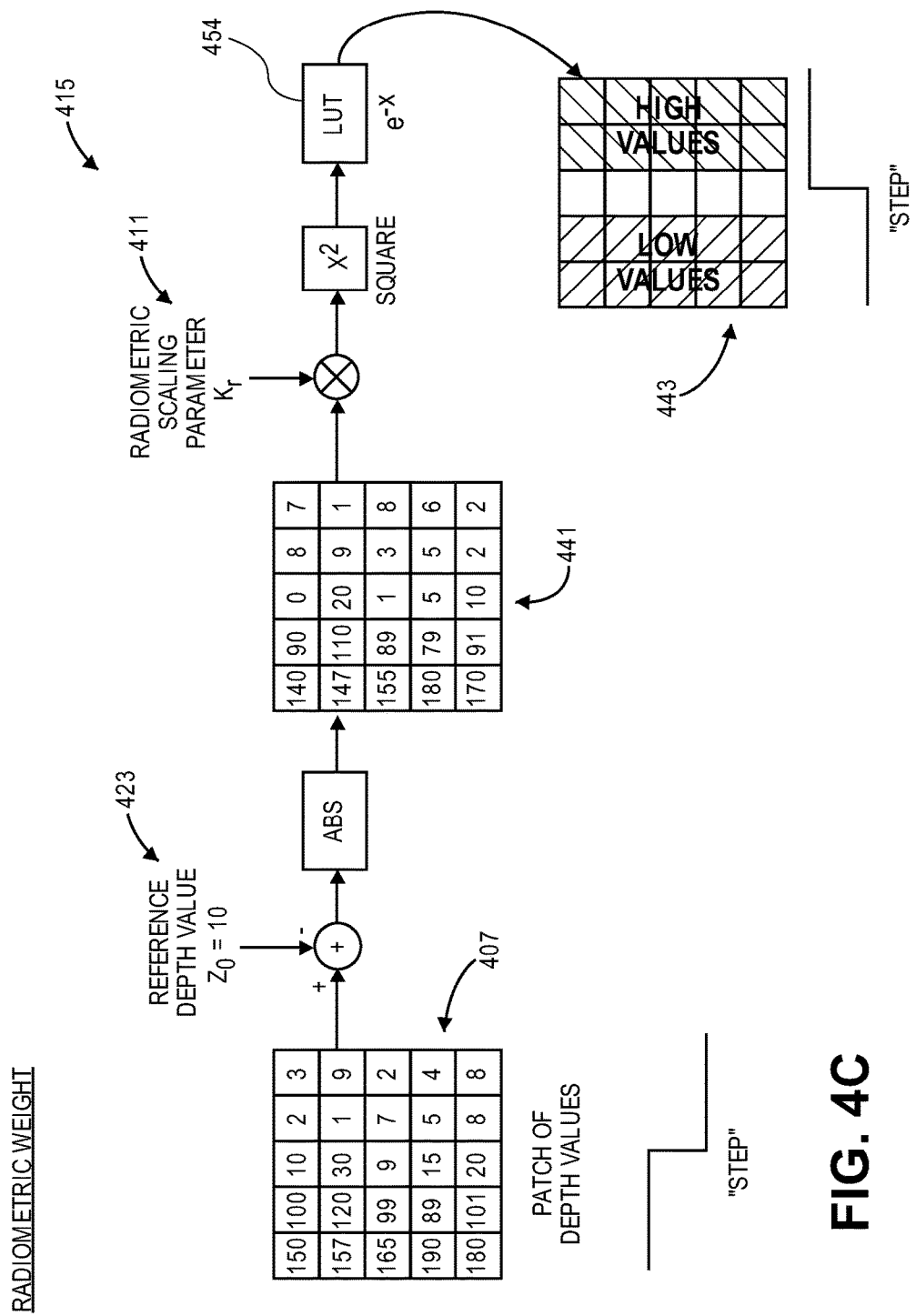
FIG. 4C illustrates computation of a radiometric weight as described with reference to FIG. 4A according to one embodiment.
Figure 4E:
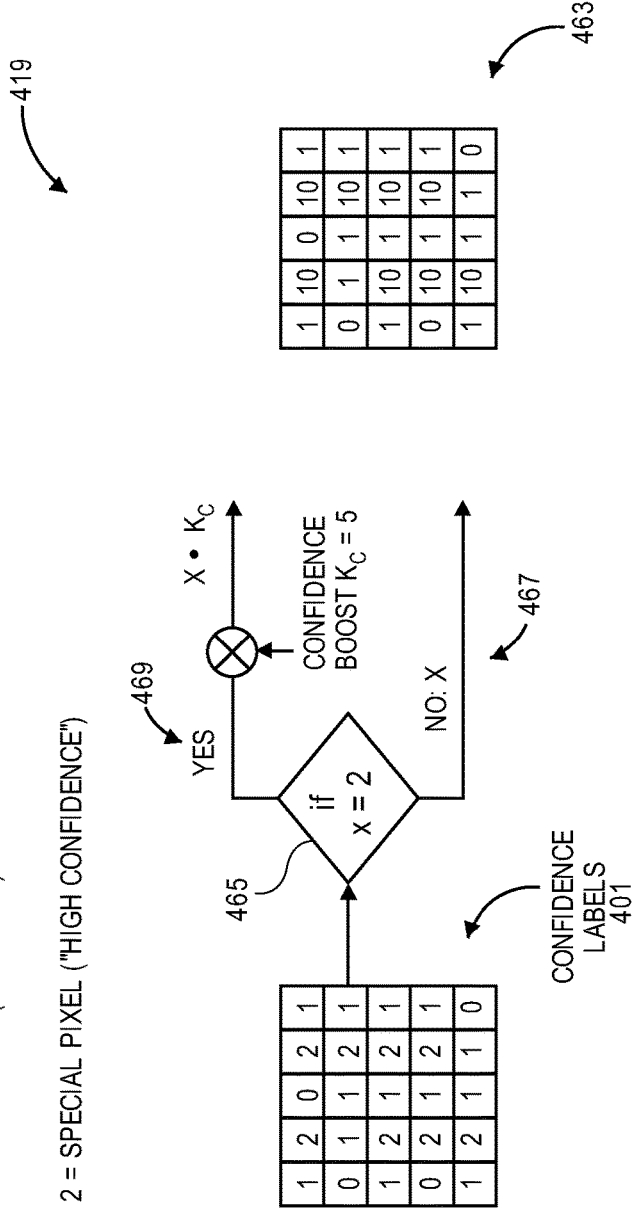
FIG. 4E illustrates computation of a confidence weight as described with reference to FIG. 4A according to one embodiment.

In one embodiment, a smart filter may be obtained by determining reference depth value 413, as shown in FIG. 4B, and computing, combining, and assigning various filter weights, such as radiometric weight 415, as shown in FIG. 4C, spatial weight 417, as shown in FIG. 4D, and confidence weight 419, as shown in FIG. 4E. In one embodiment, reference depth value 413 may be computed using one or more inputs, such as parameters 411, depth Z patch 403, etc., as facilitated by reference logic 221 of FIG. 2. Similarly, in one embodiment, radiometric weight 415 may be computed using one or more inputs, such as parameters 411, depth Z patch 403, values $Z_0$ 423 of reference depth value 413, etc., as facilitated by radiometric logic 223 of FIG. 2. Further, in one embodiment, spatial weight 417 may be computed using one or more inputs, such as parameters 411, values $Z_0$ 423 of reference depth value 413, etc., as facilitated by spatial logic 225 of FIG. 2. Moreover, in one embodiment, confidence weight 419 may be computed using one or more inputs, such as parameters 411, label L patch 401, etc., as facilitated by confidence logic 227 of FIG. 2.

As aforementioned, the resulting values, such as $Z_0$ 423, of reference depth value 413 may be inputted for computations of depth weight 415 and spatial weight 417, while resulting values of other weight computations, such as $W_r$ 425 of radiometric weight 415, $W_s$ 427 of spatial weight 417, and Wc 429 of confidence weight 419, etc., may be used for further computations, as illustrated, to obtain the final output 421 representing the smart filter that may the be applied to eliminate the noise (e.g., quantization noise) from the digital image.

Referring now to FIG. 4B, it illustrates computation of reference depth value 413 as described with reference to FIG. 4A according to one embodiment. Shown is an instance of a sliding window used by the filter, comprising a block ("patch") 403 of depth image pixels and a corresponding block or patch 401 of side information ("label") pixels. For example, as illustrated, in one embodiment, if central pixel 433 of the depth patch 403 is determined as having high confidence (for example, having the corresponding pixel 431 from patch 401 as being "valid"), then the value of pixel 433 may be taken as a reference depth. If not, an average value of valid pixels in sub-patch 432 of 401 is taken as a reference, where the validity of the pixels in the sub-patch is determined by sub-patch 434 of 403.

FIG. 4C illustrates computation of radiometric (depth) weight 415 as described with reference to FIG. 4A according to one embodiment. In one embodiment, as illustrated, radiometric weight 415 may be computed using an input of a patch 407, along with reference depth value 423 (computed, for example, as shown in FIG. 4B), to obtain radiometric (depth) differences 441 to finally obtain radiometric weight values 443. In the illustrated example, the input of a patch contains a step-like edge (depth discontinuity), producing a radiometric weight that is also step-like. In some embodiments, a specific shape of the radiometric weight function may be determined by using a look-up table (LUT), such as LUT 454. As a particular case, the Gaussian weight is obtained when LUT 454 contains the exponential function $e^{-x}$. In one embodiment, radiometric weight 415 may be regarded as a Gaussian of varying variance, where the variance depends on the depth (for example, through the "radiometric scaling parameter" 411), which is computed as the reference depth value 413.

FIG. 4D illustrates computation of spatial weight 417 as described with reference to FIG. 4A according to one embodiment. In one embodiment, as illustrated, patch 451 having squares distances 453 from central pixel 433 may be used with inputted parameters 411 to obtain spatial Gaussian weight 455. In some embodiments, a specific shape of the spatial weight function may be determined by using a look-up table (LUT), such as LUT 454. As a particular case, the Gaussian weight is obtained when the LUT contains the exponential function $e^{-x}$. In one embodiment, spatial weight may refer to a spatial Gaussian of varying variance, where the variance depends on the depth (for example, through the "spatial scaling parameter" 412), which is computed as the reference depth value 413.

FIG. 3D illustrates an option of grouping together pixels to approximate a spatial Gaussian window, such as window 360, using its radial symmetry, wherein pixels at approximately equal distance from the central pixel are assigned the same weight. In some embodiments, similar operations may be applied to several pixels at once rather than to each pixel individually. Referring now to FIG. 4D, such an option is illustrated by showing an approximation 457 of squared distances in patch 451, having pixels in circular bands 459.

FIG. 4E illustrates computation of confidence weight 419 as described with reference to FIG. 4A according to one embodiment. In one embodiment, as illustrated, the pixels in patch of confidence labels 401 may have three levels of confidence designated by numbers (such as 0=invalid, 1=normal confidence, 2=high confidence). In one embodiment, a determination of confidence weight 463 is made in a pixel-wise manner, considering the confidence label x at each pixel; if x=2, the process continues at 469 with the pixel being considered a special pixel with high confidence and its weight is boosted by a value of "confidence boost" Kc. If, however, if x does not equal 2, the process continues at 467, where if x=1, the pixel is regarded as a confident or normal pixel, while if x=0, the pixel lacks confidence and is considered a "bad" pixel.

In one embodiment, confidence weight 419 refers to a confidence level of each pixel, such as 1) normal level refers to a normal pixel, 2) high level refers to a special pixel, such as one of code transition pixels, that is more confident than normal, 3) low level refers to a low confidence pixel that is a bad pixel which may be problematic for coding purposes, and 4) other additional or alternative confidence levels. In one example, higher weights may be given to pixels with high confidence level, where, in another example, the weights may be set such that merely the high confidence pixels are used.

Figure 7:
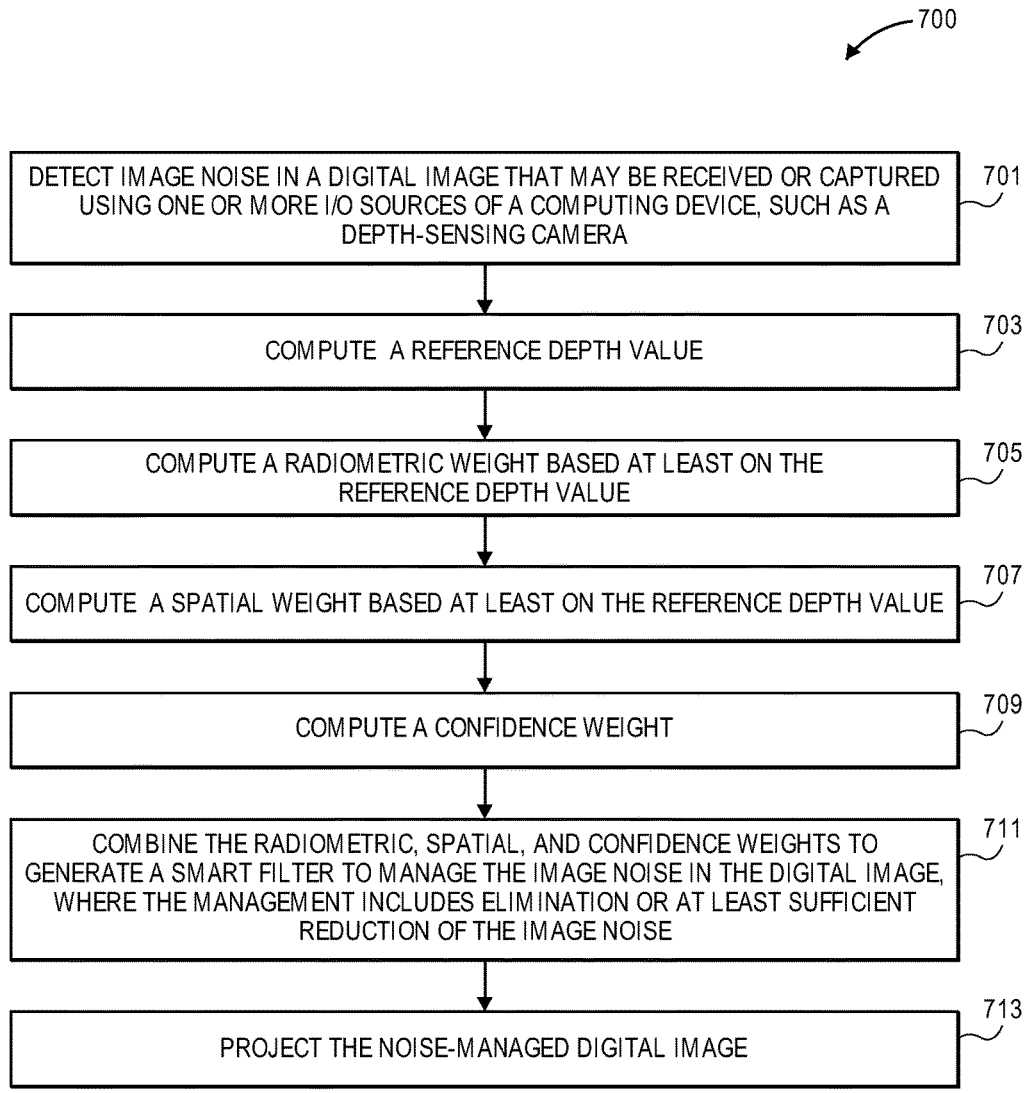
FIG. 7 illustrates a method for facilitating noise management in images using a non-linear filter according to one embodiment.

FIG. 7 illustrates a method 700 for facilitating image noise management using a smart filter according to one embodiment. Method 700 may be performed by processing logic that may comprise hardware (e.g., circuitry, dedicated logic, programmable logic, etc.), software (such as instructions run on a processing device), or a combination thereof, as facilitated by noise management mechanism 110 of FIGS. 1-2. The processes of method 700 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 700 begins at block 701 with detection of noise (e.g., quantization noise) in a digital image that may be received or captured using one or more I/O sources 108 of computing device 100, such as depth-sensing camera 241 of FIG. 2. At block 703, a reference depth value is computed using one or more inputs, such as depth pixels, parameters, etc. At block 705, a radiometric weight may be computed using one or more inputs, such as depth pixels, the parameters, the reference depth value, etc. At block 707, a spatial weight is computed using one or more inputs, such as the parameters, the reference depth value, etc. At block 709, a confidence weight is computed for label pixels and based on the parameters. At block 711, in one embodiment, the three weights, such as radiometric weight, the spatial weight, the confidence weight, etc., are combined to generate a smart filter to manage the image noise in the digital image, where management includes elimination or at least sufficient reduction of the unnecessary image noise. At block 713, using a projector, such as projector 243 of FIG. 2, to project the noise-managed digital image.

Figure 5:
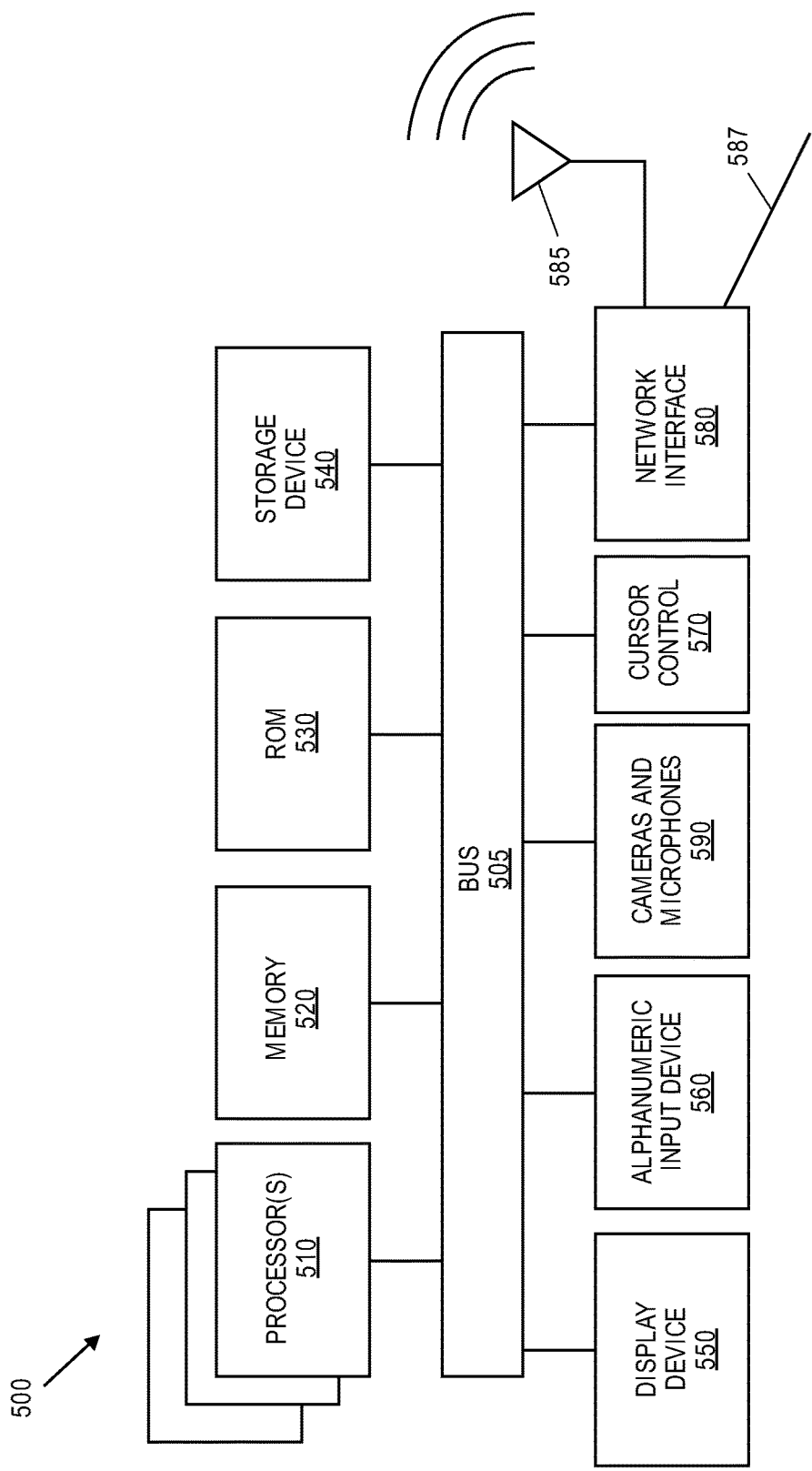
FIG. 5 illustrates computer system suitable for implementing embodiments of the present disclosure according to one embodiment.

Referring now to FIG. 5, it illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information.

While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
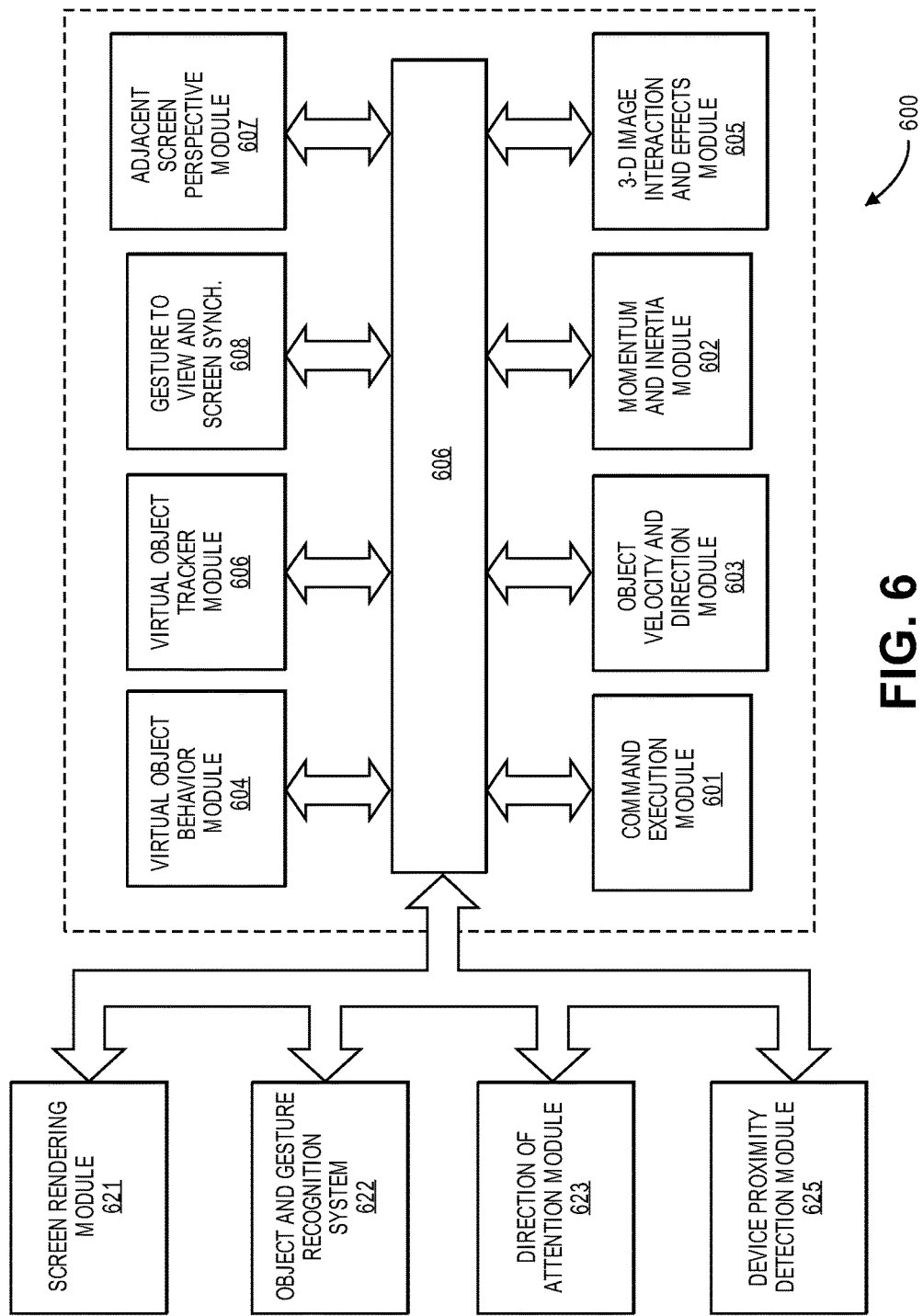
FIG. 6 illustrates computer environment suitable for implementing embodiments of the present disclosure according to one embodiment.

FIG. 6 illustrates an embodiment of a computing environment 600 capable of supporting the operations discussed above. The modules and systems can be implemented in a variety of different hardware architectures and form factors including that shown in FIG. 9.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System, using one or more cameras, without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of an display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate increased user experience and efficient power performance using intelligent segmentation on flexible display screens, comprising: detection/reception logic to detect a digital image of an object, the digital image including pixels having associated pixel values contaminated by noise, and side information pertaining to confidence of a value acquired in each pixel; computation engine to measure characteristics of noise in each pixel of the digital image, wherein the computation engine is further to measure a plurality of weights relating to one or more of the pixel values, the side information, and the noise characteristics, and wherein the computation engine is further to compute a smart filter based on a combination of the plurality of weights; application/execution logic to apply the smart filter to filter the digital image by reducing the noise in the digital image; and communication/compatibility logic to output the filtered digital image.

Example 2 includes the subject matter of Example 1, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise comprises image noise including at least one of depth quantization noise, saw-tooth noise, Gaussian noise, Poisson noise, salt-and-pepper noise, short noise, anisotropic noise, and film grain.

Example 3 includes the subject matter of Example 1, wherein the side information contains confidence in estimated depth values, wherein each pixel having associated a confidence level including at least one of a high confidence level, a normal confidence level, and a low confidence level.

Example 4 includes the subject matter of Example 1, wherein the plurality of weights comprises a spatial weight, a confidence weight, and a radiometric weight, wherein the plurality of weights are computed in dependence on the noise characteristics, wherein a noise characteristic is determined based on a depth value in each pixel of the digital image.

Example 5 includes the subject matter of Example 4, wherein the radiometric weight is computed using a reference depth value, wherein the reference depth value is computed using an average of central pixels with the high confidence level, wherein the radiometric weight is a Gaussian function depending on a distance of the pixel depth value to the reference depth value, and wherein a width of the Gaussian function is based on the reference depth value.

Example 6 includes the subject matter of Example 4, wherein the spatial weight is a Gaussian function depending on a distance from a central pixel, wherein spatial weight values in radially-symmetric blocks of pixels are facilitated as having equal values, wherein an application of the plurality of weights in radially-symmetric blocks of the pixels is performed, sequentially or simultaneously, for the pixels in a block.

Example 7 includes the subject matter of Example 4, wherein at least one of: high confidence pixels are assigned high values by confidence weight and no-confidence pixels having assigned zero weight are discarded.

Example 8 includes the subject matter of Example 1, wherein the smart filter is applied by running a sliding window on the digital image and computing a filter output for each position of the window, wherein the plurality of weights are computed on a block of pixels of the sliding window for each position.

Some embodiments pertain to Example 9 that includes a method for facilitating depth image dequantization at computing devices, comprising: detecting a digital image of an object, the digital image including pixels having associated pixel values contaminated by noise, and side information pertaining to confidence of a value acquired in each pixel; measuring characteristics of noise in each pixel of the digital image, and a plurality of weights relating to one or more of the pixel values, the side information, and the noise characteristics; computing a smart filter based on a combination of the plurality of weights; applying the smart filter to filter the digital image by reducing the noise in the digital image; and outputting the filtered digital image.

Example 10 includes the subject matter of Example 9, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise comprises image noise including at least one of depth quantization noise, saw-tooth noise, Gaussian noise, Poisson noise, salt-and-pepper noise, short noise, anisotropic noise, and film grain.

Example 11 includes the subject matter of Example 9, wherein the side information contains confidence in estimated depth values, wherein each pixel having associated a confidence level including at least one of a high confidence level, a normal confidence level, and a low confidence level.

Example 12 includes the subject matter of Example 9, wherein the plurality of weights comprises a spatial weight, a confidence weight, and a radiometric weight, wherein the plurality of weights are computed in dependence on the noise characteristics, wherein a noise characteristic is determined based on a depth value in each pixel of the digital image.

Example 13 includes the subject matter of Example 12, wherein the radiometric weight is computed using a reference depth value, wherein the reference depth value is computed using an average of central pixels with the high confidence level, wherein the radiometric weight is a Gaussian function depending on a distance of the pixel depth value to the reference depth value, and wherein a width of the Gaussian function is based on the reference depth value.

Example 14 includes the subject matter of Example 12, wherein the spatial weight is a Gaussian function depending on a distance from a central pixel, wherein spatial weight values in radially-symmetric blocks of pixels are facilitated as having equal values, wherein an application of the plurality of weights in radially-symmetric blocks of the pixels is performed, sequentially or simultaneously, for the pixels in a block.

Example 15 includes the subject matter of Example 12, wherein at least one of: high confidence pixels are assigned high values by confidence weight and no-confidence pixels having assigned zero weight are discarded.

Example 16 includes the subject matter of Example 9, wherein the smart filter is applied by running a sliding window on the digital image and computing a filter output for each position of the window, wherein the plurality of weights are computed on a block of pixels of the sliding window for each position.

Some embodiments pertain to Example 17 includes a system comprising a storage device having instructions, and a processor to execute the instructions to facilitate a mechanism to perform one or more operations comprising: detecting a digital image of an object, the digital image including pixels having associated pixel values contaminated by noise, and side information pertaining to confidence of a value acquired in each pixel; measuring characteristics of noise in each pixel of the digital image, and a plurality of weights relating to one or more of the pixel values, the side information, and the noise characteristics; computing a smart filter based on a combination of the plurality of weights; applying the smart filter to filter the digital image by reducing the noise in the digital image; and outputting the filtered digital image.

Example 18 includes the subject matter of Example 17, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise comprises image noise including at least one of depth quantization noise, saw-tooth noise, Gaussian noise, Poisson noise, salt-and-pepper noise, short noise, anisotropic noise, and film grain.

Example 19 includes the subject matter of Example 17, wherein the side information contains confidence in estimated depth values, wherein each pixel having associated a confidence level including at least one of a high confidence level, a normal confidence level, and a low confidence level.

Example 20 includes the subject matter of Example 17, wherein the plurality of weights comprises a spatial weight, a confidence weight, and a radiometric weight, wherein the plurality of weights are computed in dependence on the noise characteristics, wherein a noise characteristic is determined based on a depth value in each pixel of the digital image.

Example 21 includes the subject matter of Example 20, wherein the radiometric weight is computed using a reference depth value, wherein the reference depth value is computed using an average of central pixels with the high confidence level, wherein the radiometric weight is a Gaussian function depending on a distance of the pixel depth value to the reference depth value, and wherein a width of the Gaussian function is based on the reference depth value.

Example 22 includes the subject matter of Example 20, wherein the spatial weight is a Gaussian function depending on a distance from a central pixel, wherein spatial weight values in radially-symmetric blocks of pixels are facilitated as having equal values, wherein an application of the plurality of weights in radially-symmetric blocks of the pixels is performed, sequentially or simultaneously, for the pixels in a block.

Example 23 includes the subject matter of Example 20, wherein at least one of: high confidence pixels are assigned high values by confidence weight and no-confidence pixels having assigned zero weight are discarded.

Example 24 includes the subject matter of Example 17, wherein the smart filter is applied by running a sliding window on the digital image and computing a filter output for each position of the window, wherein the plurality of weights are computed on a block of pixels of the sliding window for each position.

Some embodiments pertain to Example 25 includes an apparatus comprising: means for detecting a digital image of an object, the digital image including pixels having associated pixel values contaminated by noise, and side information pertaining to confidence of a value acquired in each pixel; means for measuring characteristics of noise in each pixel of the digital image, and a plurality of weights relating to one or more of the pixel values, the side information, and the noise characteristics; means for computing a smart filter based on a combination of the plurality of weights; means for applying the smart filter to filter the digital image by reducing the noise in the digital image; and means for outputting the filtered digital image.

Example 26 includes the subject matter of Example 25, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise comprises image noise including at least one of depth quantization noise, saw-tooth noise, Gaussian noise, Poisson noise, salt-and-pepper noise, short noise, anisotropic noise, and film grain.

Example 27 includes the subject matter of Example 25, wherein the side information contains confidence in estimated depth values, wherein each pixel having associated a confidence level including at least one of a high confidence level, a normal confidence level, and a low confidence level.

Example 28 includes the subject matter of Example 25, wherein the plurality of weights comprises a spatial weight, a confidence weight, and a radiometric weight, wherein the plurality of weights are computed in dependence on the noise characteristics, wherein a noise characteristic is determined based on a depth value in each pixel of the digital image.

Example 29 includes the subject matter of Example 28, wherein the radiometric weight is computed using a reference depth value, wherein the reference depth value is computed using an average of central pixels with the high confidence level, wherein the radiometric weight is a Gaussian function depending on a distance of the pixel depth value to the reference depth value, and wherein a width of the Gaussian function is based on the reference depth value.

Example 30 includes the subject matter of Example 28, wherein the spatial weight is a Gaussian function depending on a distance from a central pixel, wherein spatial weight values in radially-symmetric blocks of pixels are facilitated as having equal values, wherein an application of the plurality of weights in radially-symmetric blocks of the pixels is performed, sequentially or simultaneously, for the pixels in a block.

Example 31 includes the subject matter of Example 28, wherein at least one of: high confidence pixels are assigned high values by confidence weight and no-confidence pixels having assigned zero weight are discarded.

Example 32 includes the subject matter of Example 25, wherein the smart filter is applied by running a sliding window on the digital image and computing a filter output for each position of the window, wherein the plurality of weights are computed on a block of pixels of the sliding window for each position.

Example 33 includes at least one non-transitory or tangible machine-readable medium comprising a plurality of instructions, when executed on a computing device, to implement or perform a method as claimed in any of claims or examples 9-16.

Example 34 includes at least one machine-readable medium comprising a plurality of instructions, when executed on a computing device, to implement or perform a method as claimed in any of claims or examples 9-16.

Example 35 includes a system comprising a mechanism to implement or perform a method as claimed in any of claims or examples 9-16.

Example 36 includes an apparatus comprising means for performing a method as claimed in any of claims or examples 9-16.

Example 37 includes a computing device arranged to implement or perform a method as claimed in any of claims or examples 9-16.

Example 38 includes a communications device arranged to implement or perform a method as claimed in any of claims or examples 9-16.

Example 39 includes at least one machine-readable medium comprising a plurality of instructions, when executed on a computing device, to implement or perform a method or realize an apparatus as claimed in any preceding claims.

Example 40 includes at least one non-transitory or tangible machine-readable medium comprising a plurality of instructions, when executed on a computing device, to implement or perform a method or realize an apparatus as claimed in any preceding claims.

Example 41 includes a system comprising a mechanism to implement or perform a method or realize an apparatus as claimed in any preceding claims.

Example 42 includes an apparatus comprising means to perform a method as claimed in any preceding claims.

Example 43 includes a computing device arranged to implement or perform a method or realize an apparatus as claimed in any preceding claims.

Example 44 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   detection and/or reception logic, at least a portion of which is implemented in hardware, to detect a digital image of an object, the digital image including pixels having associated pixel values contaminated by noise, and side information pertaining to confidence of a value acquired in each pixel;
   computation engine, at least a portion of which is implemented in hardware, to measure characteristics of noise in each pixel of the digital image, wherein the computation engine is further to measure a plurality of weights relating to one or more of the pixel values, the side information, and the noise characteristics, and wherein the computation engine is further to compute a smart filter based on a combination of the plurality of weights, wherein the plurality of weights comprises a spatial weight, a confidence weight, and a radiometric weight, wherein the plurality of weights are computed in dependence on the noise characteristics, wherein a noise characteristic is determined based on a depth value in each pixel of the digital image;
   application and/or execution logic, at least a portion of which is implemented in hardware, to apply the smart filter to filter the digital image by reducing the noise in the digital image; and
   communication and/or compatibility logic, at least a portion of which is implemented in hardware, to output the filtered digital image.

2. The apparatus of claim 1, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise comprises image noise including at least one of depth quantization noise, saw-tooth noise, Gaussian noise, Poisson noise, salt-and-pepper noise, short noise, anisotropic noise, and film grain.

3. The apparatus of claim 1, wherein the side information contains confidence in estimated depth values, wherein each pixel having associated a confidence level including at least one of a high confidence level, a normal confidence level, and a low confidence level.

4. The apparatus of claim 1, wherein the radiometric weight is computed using a reference depth value, wherein the reference depth value is computed using an average of central pixels with the high confidence level, wherein the radiometric weight is a Gaussian function depending on a distance of the pixel depth value to the reference depth value, and wherein a width of the Gaussian function is based on the reference depth value.

5. The apparatus of claim 1, wherein the spatial weight is a Gaussian function depending on a distance from a central pixel, wherein spatial weight values in radially-symmetric blocks of pixels are facilitated as having equal values, wherein an application of the plurality of weights in radially-symmetric blocks of the pixels is performed, sequentially or simultaneously, for the pixels in a block.

6. The apparatus of claim 1, wherein at least one of: high confidence pixels are assigned high values by confidence weight and no-confidence pixels having assigned zero weight are discarded.

7. The apparatus of claim 1, wherein the smart filter is applied by running a sliding window on the digital image and computing a filter output for each position of the window, wherein the plurality of weights are computed on a block of pixels of the sliding window for each position.

8. A method comprising:
   detecting a digital image of an object, the digital image including pixels having associated pixel values contaminated by noise, and side information pertaining to confidence of a value acquired in each pixel;
   measuring characteristics of noise in each pixel of the digital image, and a plurality of weights relating to one or more of the pixel values, the side information, and the noise characteristics;
   computing a smart filter based on a combination of the plurality of weights, wherein the plurality of weights comprises a spatial weight, a confidence weight, and a radiometric weight, wherein the plurality of weights are computed in dependence on the noise characteristics, wherein a noise characteristic is determined based on a depth value in each pixel of the digital image;
   applying the smart filter to filter the digital image by reducing the noise in the digital image; and
   outputting the filtered digital image.

9. The method of claim 8, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise comprises image noise including at least one of depth quantization noise, saw-tooth noise, Gaussian noise, Poisson noise, salt-and-pepper noise, short noise, anisotropic noise, and film grain.

10. The method of claim 8, wherein the side information contains confidence in estimated depth values, wherein each pixel having associated a confidence level including at least one of a high confidence level, a normal confidence level, and a low confidence level.

11. The method of claim 8, wherein the radiometric weight is computed using a reference depth value, wherein the reference depth value is computed using an average of central pixels with the high confidence level, wherein the radiometric weight is a Gaussian function depending on a distance of the pixel depth value to the reference depth value and wherein a width of the Gaussian function is based on the reference depth value.

12. The method of claim 8, wherein the spatial weight is a Gaussian function depending on a distance from a central pixel, wherein spatial weight values in radially-symmetric blocks of pixels are facilitated as having equal values, wherein an application of the plurality of weights in radially-symmetric blocks of the pixels is performed, sequentially or simultaneously, for the pixels In a block.

13. The method of claim 8, wherein at least one of: high confidence pixels are assigned high values by confidence weight and no-confidence pixels having assigned zero weight are discarded.

14. The method of claim 8, wherein the smart filter is applied by running a sliding window on the digital image and computing a filter output for each position of the window, wherein the plurality of weights are computed on a block of pixels of the sliding window for each position.

15. At least one non-transitory machine-readable medium comprising a plurality of instructions, executed on a computing device, to facilitate the computing device to perform one or more operations comprising:
- detecting a digital image of an object, the digital image including pixels having associated pixel values contaminated by noise, and side information pertaining to confidence of a value acquired in each pixel;
- measuring characteristics of noise in each pixel of the digital image, and a plurality of weights relating to one or more of the pixel values, the side information, and the noise characteristics;
- computing a smart filter based on a combination of the plurality of weights, wherein the plurality of weights comprises a spatial weight, a confidence weight, and a radiometric weight, wherein the plurality of weights are computed in dependence on the noise characteristics, wherein a noise characteristic is determined based on a depth value in each pixel of the digital image;
- applying the smart filter to filter the digital image by reducing the noise in the digital image; and
- outputting the filtered digital image.

16. The non-transitory machine-readable medium of claim 15, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise comprises image noise including at least one of depth quantization noise, saw-tooth noise, Gaussian noise, Poisson noise, salt-and-pepper noise, short noise, anisotropic noise, and film grain.

17. The non-transitory machine-readable medium of claim 15, wherein the side information contains confidence in estimated depth values, wherein each pixel having associated a confidence level including at least one of a high confidence level, a normal confidence level, and a low confidence level.

18. The non-transitory machine-readable medium of claim 15, wherein the radiometric weight is computed using a reference depth value, wherein the reference depth value is computed using an average of central pixels with the high confidence level, wherein the radiometric weight is a Gaussian function depending on a distance of the pixel depth value to the reference depth value, and wherein a width of the Gaussian function is based on the reference depth value.

19. The non-transitory machine-readable medium of claim 15, wherein the spatial weight is a Gaussian function depending on a distance from a central pixel, wherein spatial weight values in radially-symmetric blocks of pixels are facilitated as having equal values, wherein an application of the plurality of weights in radially-symmetric blocks of the pixels is performed, sequentially or simultaneously, for the pixels in a block.

20. The non-transitory machine-readable medium of claim 15, wherein at least one of: high confidence pixels are assigned high values by confidence weight and no-confidence pixels having assigned zero weight are discarded.

21. The non-transitory machine-readable medium of claim 15, wherein the smart filter is applied by running a sliding window on the digital image and computing a filter output for each position of the window, wherein the plurality of weights are computed on a block of pixels of the sliding window for each position.

* * * * *